(12) United States Patent
Cook

(10) Patent No.: US 11,793,189 B1
(45) Date of Patent: Oct. 24, 2023

(54) MOUSE TRAP

(71) Applicant: Paul F. Cook, Champaign, IL (US)

(72) Inventor: Paul F. Cook, Champaign, IL (US)

( * ) Notice: Subject to any disclaimer, the term of this patent is extended or adjusted under 35 U.S.C. 154(b) by 0 days.

(21) Appl. No.: 18/079,078

(22) Filed: Dec. 12, 2022

(51) Int. Cl.
*A01M 23/30* (2006.01)

(52) U.S. Cl.
CPC .................... *A01M 23/30* (2013.01)

(58) Field of Classification Search
CPC ........................................ A01M 23/30
USPC ................. 43/81, 81.5, 82, 83, 83.5
See application file for complete search history.

(56) References Cited

U.S. PATENT DOCUMENTS

| | | | | |
|---|---|---|---|---|
| 288,182 A * | 11/1883 | Morris et al. | ......... | A01M 23/30 43/81 |
| 528,671 A * | 11/1894 | Hooker | ................ | A01M 23/30 43/81 |
| 591,956 A * | 10/1897 | Davis | ................ | A01M 23/30 43/81 |
| 873,988 A * | 12/1907 | Chasse | ................ | A01M 23/30 43/81 |
| 929,493 A * | 7/1909 | Rich | ................ | A01M 23/30 43/83.5 |
| 1,194,954 A * | 8/1916 | Casey | ................ | A01M 23/30 43/81 |
| 1,384,890 A * | 7/1921 | Gilmore | ................ | A01M 23/24 43/81 |
| 1,499,193 A * | 6/1924 | Plants | ................ | A01M 23/30 43/81 |
| 1,671,258 A * | 5/1928 | Seghers | ................ | A01M 23/30 43/81.5 |
| 2,000,752 A * | 5/1935 | Graybill | ................ | A01M 23/30 43/83.5 |
| 2,103,877 A * | 12/1937 | Stilson | ................ | A01M 23/30 43/81 |
| 2,175,754 A * | 10/1939 | Harrison | ................ | A01M 23/30 43/81 |
| 2,311,490 A * | 2/1943 | Turpan | ................ | A01M 23/30 43/81 |
| 2,368,581 A * | 1/1945 | Stilson | ................ | A01M 23/30 43/81 |
| 2,417,891 A * | 3/1947 | Stout | ................ | A01M 23/30 43/81.5 |
| 2,475,884 A * | 7/1949 | Fitzsimons | ........... | A01M 23/30 43/81 |
| 2,517,928 A * | 8/1950 | Richards | ................ | A01M 23/30 43/81 |
| 2,543,466 A * | 2/1951 | Heinrich | ................ | A01M 23/30 43/81 |
| 2,544,295 A * | 3/1951 | Brust | ................ | A01M 23/30 43/81 |
| 2,581,628 A * | 1/1952 | Burwell | ................ | A01M 23/30 43/81 |

(Continued)

FOREIGN PATENT DOCUMENTS

DE 1109944 B * 6/1961
DE 1125712 B * 3/1962

(Continued)

*Primary Examiner* — Darren W Ark
(74) *Attorney, Agent, or Firm* — Philip L. Bateman

(57) ABSTRACT

A mouse trap has a trigger with a socket and has a latch having a spherical enlargement at its distal end. The spherical enlargement engages the socket of the trigger to form a ball and socket structure when the mouse trap is armed.

4 Claims, 2 Drawing Sheets

(56) References Cited

U.S. PATENT DOCUMENTS

| | | | | |
|---|---|---|---|---|
| 3,055,140 | A * | 9/1962 | McAllister | A01M 23/30 43/81 |
| 4,245,423 | A * | 1/1981 | Souza | A01M 23/30 43/81 |
| 5,337,512 | A * | 8/1994 | Krenzler | A01M 23/30 43/81 |
| 5,375,367 | A * | 12/1994 | Pust | A01M 23/30 43/81 |
| 6,655,077 | B1 * | 12/2003 | Trevino | A01M 23/30 43/81 |
| 9,119,390 | B1 * | 9/2015 | Greenfield | A01M 23/30 |
| 9,131,676 | B1 * | 9/2015 | Derman | A01M 23/30 |
| 10,524,464 | B1 * | 1/2020 | Cook | A01M 23/30 |
| 10,667,508 | B1 * | 6/2020 | Cook | A01M 23/30 |
| 2013/0036658 | A1 * | 2/2013 | Bayne | A01M 23/005 43/81 |
| 2017/0238525 | A1 * | 8/2017 | Derman | A01M 23/30 |
| 2018/0125056 | A1 * | 5/2018 | Hetman | A01M 23/245 |
| 2021/0345596 | A1 * | 11/2021 | Ledbetter | A01M 23/30 |
| 2021/0400950 | A1 * | 12/2021 | Spandrio | A01M 23/30 |

FOREIGN PATENT DOCUMENTS

| | | | | |
|---|---|---|---|---|
| GB | 2512625 A | * | 10/2014 | A01M 23/30 |
| WO | WO-2010022779 A1 | * | 3/2010 | A01M 23/30 |
| WO | WO-2018144089 A1 | * | 8/2018 | A01M 23/245 |

* cited by examiner

MOUSE TRAP

FIELD OF THE INVENTION

This invention relates to vermin traps. More particularly, this invention relates to mouse traps having a swinging striker.

BACKGROUND OF THE INVENTION

Mouse traps (also spelled "mousetraps") are widely used to capture and kill mice. The most common type of mouse trap contains a spring-loaded striker that is released when the mouse depresses a trigger. Similar but larger traps are used for rats, chipmunks, moles, and other vermin. The term "mouse trap" is used herein to include all such spring-loaded animal traps, regardless of size. The term "mouse" is used herein to include all small vermin.

Hooker, U.S. Pat. No. 528,671, Nov. 6, 1894, discloses a mouse trap that is similar to the mouse traps widely sold today. The mouse trap comprises a wooden base (also known as a platform), a swinging striker (also known as a hammer) consisting of a rectangular shaped metal wire, a helical spring through which the base side of the swinging striker passes and having one extended end that contacts the base and one extended end that overlaps one of the sides of the swinging striker, a metal or thermoplastic trigger (also known as a trip), and a latch (also known as a retainer bar or hold-down bar).

The mouse trap is armed by first placing food or other attractant serving as bait on the trigger. The striker is then moved about 180 degrees against the force of the spring and held in place with the hand. Unless otherwise indicated expressly or by context, the term "about" is used herein to mean plus or minus 25 percent of the measurement or other quantified property referenced. The trigger is then raised slightly and the latch is placed over the striker to engage the trigger. The striker is then released. The spring forces the striker upwardly which, in turn, forces the latch upwardly against the slightly raised trigger to engage them. When the trigger is depressed by the mouse, the latch disengages, and the striker swings violently onto the mouse.

Although the basic design of the mouse trap has remained unchanged for over a century, latching and unlatching of the trigger continues to cause problems. Latching and unlatching is also referred to as engaging and disengaging. If the latching is not secure enough, the striker can accidentally hit the fingers of the person arming the mouse trap. If the latching is too secure, the striker is not released when the mouse contacts the trigger. The Hooker mouse has a latching mechanism that is variable and that is sometimes not secure enough and sometimes too secure. If the distal end of the latch is placed too close to the proximate end of the trigger, it can release too easily. If the distal end of the latch is placed too far under the proximate end of the trigger, it may not release even when a mouse contacts the distal end of the trigger.

Cook, U.S. Pat. No. 10,524,464, Jan. 7, 2020, incorporated by reference, discloses a mouse trap with a latch that has a spherical enlargement on its distal end. The spherical enlargement contains a groove on its upwardly facing surface that engages the lower surface of the trigger. This latching is exactly the same every time, but the groove is relatively small and can be difficult for persons with poor vision or poor manual dexterity to engage the latch. A similar latch is disclosed in Cook, U.S. Pat. No. 10,667,508, Jun. 2, 2020, incorporated by reference. Graybill, U.S. Pat. No. 2,000,752, May 7, 1935, discloses a mouse trap with a latch that has hemispherical projections extending outwardly from its sides.

Accordingly, there is a demand for an improved mousetrap. More particularly, there is a demand for a mouse trap that has a latching mechanism that is easy to latch, that latches exactly the same every time, that is less likely to accidentally release, and that is more likely to release when a mouse contacts the trigger.

SUMMARY OF THE INVENTION

The general object of this invention is to provide an improved mouse trap. A more particular object is to provide a mouse trap that is easy to latch, that has a latching mechanism that latches exactly the same every time, that is less likely to accidentally release, and that is more likely to release when a mouse contacts the trigger.

I have invented an improved mouse trap. The mouse trap comprises: (a) a base having a transverse midpoint dividing the base into an unarmed side and an armed side with an end; (b) a swinging striker having a proximate end pivotably attached to the midpoint of the base and resting on the unarmed side of the base when the mouse trap is in the unarmed position and suspended above the armed side of the base when the mouse trap is in the armed position; (c) a helical spring attached to the base at the midpoint biasing the striker toward the unarmed position; (d) a trigger having a proximate end and a distal end, the proximate end having a socket and being pivotably attached to the unarmed side of the base adjacent the helical spring, the distal end of the trigger having a holder for receiving a bait; and (e) a latch having a proximate end and a distal end, the proximate end being pivotably attached at the end of the armed side of the base and the distal end having a spherical enlargement for engaging the socket of the trigger when the mouse trap is in the armed position.

The mouse trap of this invention has a ball and socket type latching mechanism that is easy to latch, latches exactly the same every time, that is less likely to accidentally release, and that is more likely to release when a mouse contacts the trigger.

DETAILED DESCRIPTION OF THE INVENTION

Figure 1:
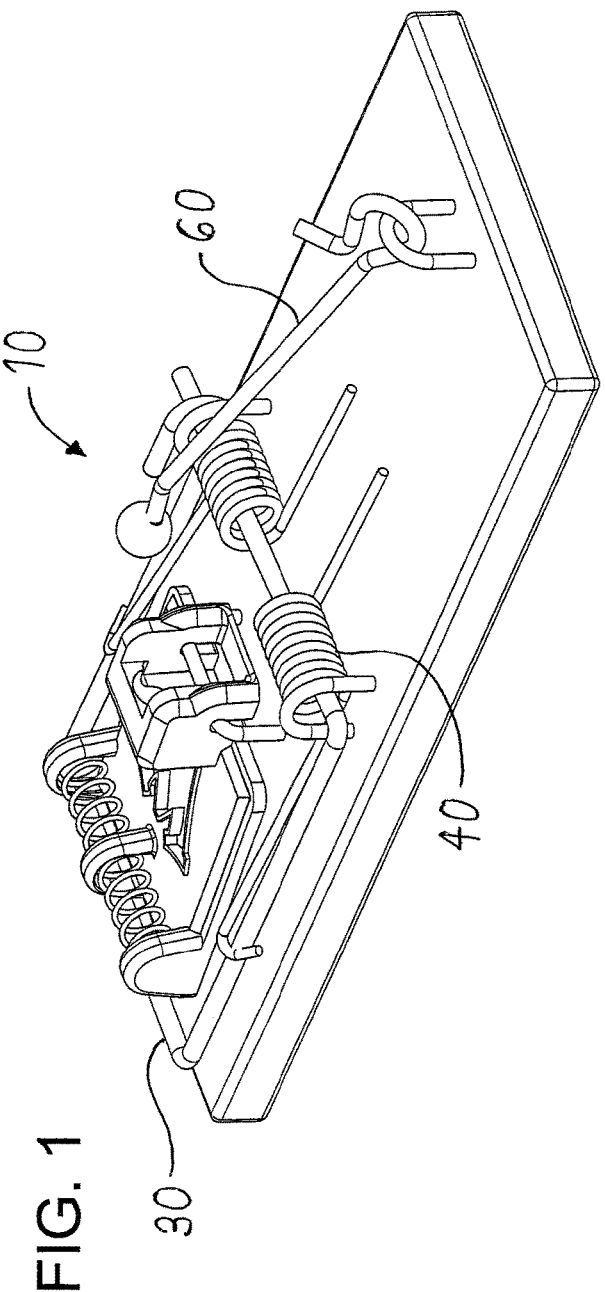
FIG. 1 is a perspective view of a preferred embodiment of the mouse trap of this invention in the unarmed position with the latch not engaged with the trigger.
Figure 2:
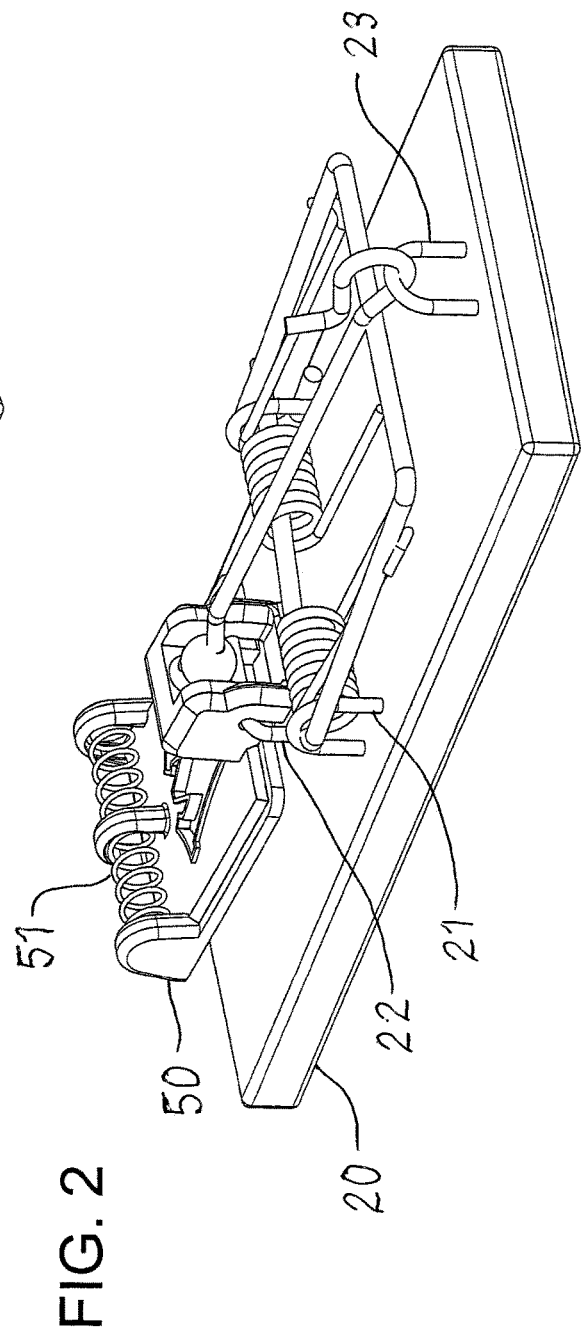
FIG. 2 is a perspective view thereof in the armed position with the latch engaged with the trigger.
Figure 3:
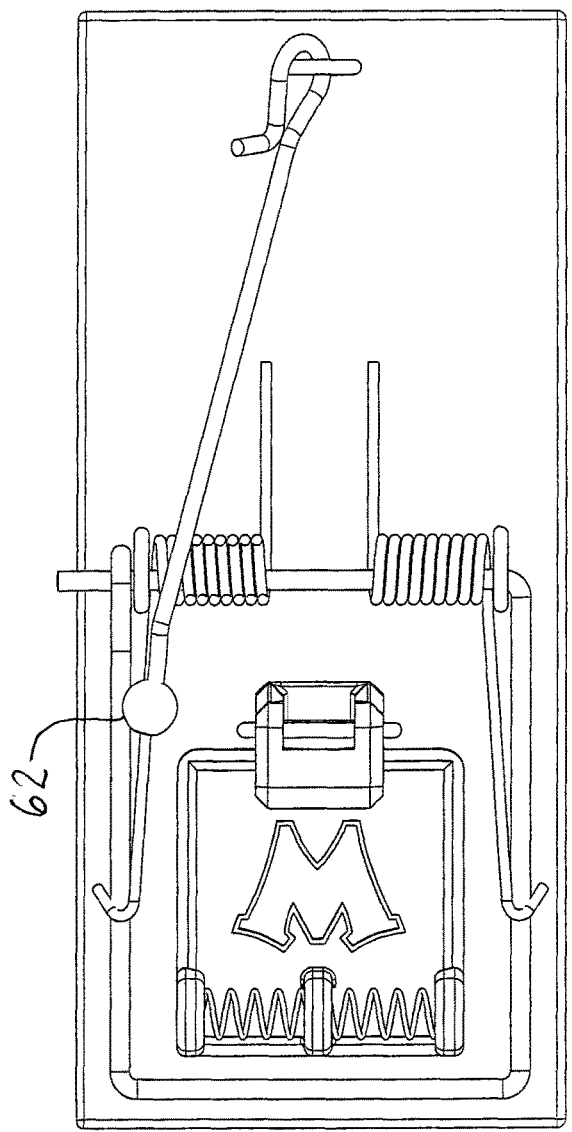
FIG. 3 is a top plan view thereof in the unarmed position with the latch not engaged with the trigger.

This invention is best understood by reference to the drawings. Referring to FIGS. 1 and 2, a preferred embodiment of the mouse trap 10 of this invention is shown in the unarmed position and in the armed position. The mouse trap comprises a base 20, a striker 30, a helical spring 40, a trigger 50, and a latch 60. The base, striker, and helical spring are conventional and are, therefore, described in only the most cursory manner below. The trigger and the latch form a ball and socket engagement when armed and are described in detail below.

The base 20 is generally rectangular and made of wood. The base has two parallel long sides and two parallel short sides. The base also has a transverse midpoint dividing the base into an unarmed side and an armed side.

The striker 30 is biased by the helical spring from an armed position to an unarmed position. The striker is generally formed of a single piece of wire in a generally rectangular shape with two portions parallel to the short sides of the base and with two portions parallel to the long sides of the base. If desired, the striker includes a handle as shown in Marsden, U.S. Pat. No. 2,602,260, Jul. 8, 1952; and Moore et al., U.S. Pat. No. 5,050,337, Sep. 24, 1991. The portions of the striker define a plane. The proximate portion parallel to the short side of the base is pivotably attached to the midpoint of the base. In the preferred embodiment, this proximate portion extends through the middle of the helical spring. The striker rests on the unarmed side of the base when the mouse trap is in the unarmed position and is suspended above the armed side of the base when the mouse trap is in the armed position.

The helical spring 40 is generally located transversely on the base at the midpoint. and is held in place with staples 21 in the base. The helical spring thus divides the base into two generally equal sized sides. The helical spring preferably consists of two separate springs, each with an extension at one end that rests on the platform and an extension at the other end that hooks onto the striker. The trigger and latch of the mouse trap of this invention are novel and are discussed in more detail below.

The trigger 50 is pivotably attached at its proximal end to the base on the unarmed side adjacent the helical spring. The trigger generally has two holes through which a lengthened staple 22 in the base passes. Alternatively, the trigger has one or more downwardly-opening slots that frictionally fit onto the staple. In both cases, the staple is transversely attached to the base. The trigger serves several functions. First, it holds the bait that attracts the mouse to the mouse trap. Second, when the mouse trap is armed, the trigger (in cooperation and engagement with the latch) secures the striker in the armed position. Third, when the trigger is depressed, it releases (disengages from) the latch to allow the striker to swing onto the mouse. As explained in more detail below, the distal end of the trigger is preferably spaced as far as practical away from the end of the base.

The trigger preferably contains one or more holders for receiving the bait. Recesses or the like are suitable, but the most preferred bait holder is a second transverse helical spring 51 as disclosed in Cook, U.S. Pat. No. 10,667,508, Jun. 2, 2020. A mouse is more likely to depress the trigger and release the latch when trying to eat bait held in a spring than in other bait holders. The spring is located on the upper surface of the trigger at or near the distal end of the trigger. The spring has interstices (spaces) between its wire rings for receiving the bait. The helical spring is preferably light in weight with the interstice width (the distance between adjacent rings) exceeding the diameter of the wire by a factor of at least two, preferably three to five. The spring is preferably made of metal wire because of its superior physical properties of strength and durability, but wires made of thermoplastics and other materials are also suitable. It can be appreciated that the function of the helical spring is to provide interstices for the bait rather than to apply a spring force. The maximum leverage is applied to the trigger by the mouse when the contact is made close to the distal end of the trigger. Accordingly, locating the spring as near as practical to the distal end maximizes the likelihood that the trigger will move and release the striker when a mouse attempts to eat the bait.

Suitable baits are foods that are attractive to mice or other vermin. The preferred bait is a semi-solid food such as peanut butter.

Figure 4:
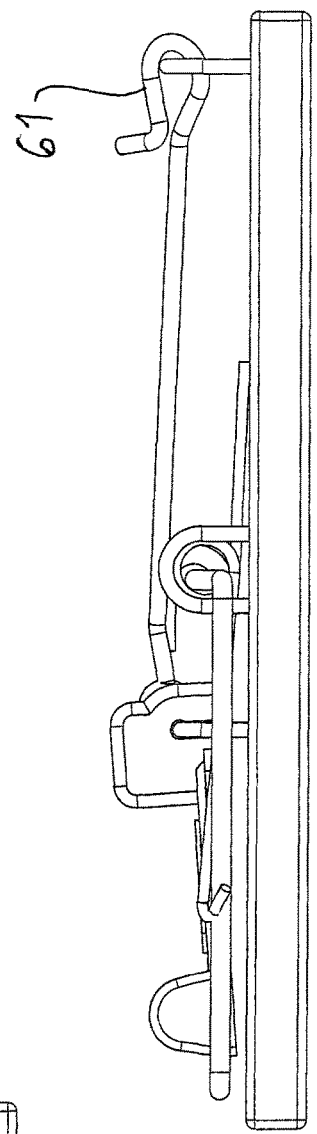
FIG. 4 is an end elevation view thereof.
Figure 5:
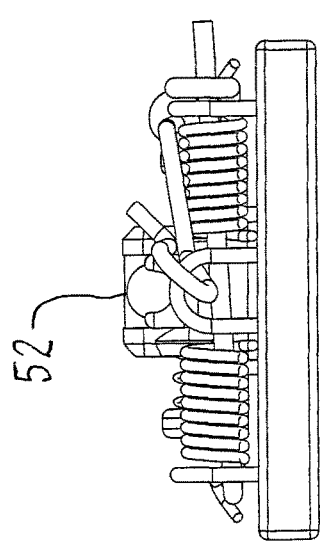
FIG. 5 is a side elevation view thereof.

The proximate end of the trigger contains an indented hemispherical socket 52 for engaging the spherical enlargement at the distal end of the latch. The socket is best seen in FIGS. 1 and 4. The diameter of the socket is a matter of choice. The diameter is generally about 3 to 6 millimeters (mm) and is preferably about 4 to 5 mm. The depth of the socket is generally about 30 to 80 percent of the diameter of the socket and is preferably about 40 to 70 percent of the diameter of the socket.

The stylized capital letter "M" on the upper surface of the trigger is for ornamental purposes only.

The latch 60 is pivotably attached at its proximate end to the base at the outer end of the armed side. The proximate end of the latch generally is formed into an eye 61 that is attached to a staple 23 in the base to provide the pivoting action. The distal end of the latch contains a spherical enlargement 62 for engaging the socket of the trigger. The diameter of the spherical enlargement is preferably slightly less than the diameter of the socket of the trigger so the spherical enlargement can engage (fit within) the socket. The spherical enlargement and the socket thus form a ball and socket structure when engaged. The latch and the trigger are shown engaged in the armed position in FIG. 2. The latch and the trigger are shown disengaged in the unarmed position in FIGS. 1, 3, 4, and 5.

The spherical enlargement of the latch and the mating socket of the trigger are easy to engage, even for persons of poor vision or poor manual dexterity. The spherical enlargement and socket also ensure that exactly the same amount of force is required to release the latch. The force required to release the latch is relatively small.

The use of the mouse trap of this invention can now be considered. The mouse trap is baited and armed in the same way as a conventional mouse trap, except that the spherical enlargement of the latch is placed into the socket of the trigger to engage.

The mouse trap of this invention is superior to conventional mouse traps. Its latching mechanism (the ball and socket engagement of the trigger and the spherical enlargement of the latch) is easy to latch. In addition, the mechanism latches exactly the same every time, is less likely to accidentally release, and is more likely to release when a mouse contacts the trigger.

I claim:

1. A mouse trap having an unarmed position and an armed position, the mouse trap comprising:
   (a) a base having a transverse midpoint dividing the base into an unarmed side and an armed side with an end;
   (b) a swinging striker having a proximate end pivotably attached to the midpoint of the base and resting on the unarmed side of the base when the mouse trap is in the unarmed position and suspended above the armed side of the base when the mouse trap is in the armed position;
   (c) a helical spring attached to the base at the midpoint biasing the striker toward the unarmed position;
   (d) a trigger having a proximate end and a distal end, the proximate end of the trigger having an indented hemispherical socket and being pivotably attached to the unarmed side of the base adjacent the helical spring, the distal end of the trigger having a holder for receiving a bait; and (e) a latch having a proximate end and a distal end, the proximate end of the latch being pivotably attached at the end of the armed side of the base and the distal end of the latch having a spherical enlargement for engaging the indented hemispherical socket of the trigger when the mouse trap is in the armed position.

2. The mouse trap of claim 1 wherein the holder for receiving a bait comprises a transverse helical spring.

3. The mouse trap of claim 1 wherein the indented hemispherical socket of the trigger has a diameter of about 4 to 5 millimeters.

4. The mouse trap of claim 1 wherein the indented hemispherical socket of the trigger has a depth and a diameter and wherein the depth is of about 40 to 70 percent of the diameter.

\* \* \* \* \*